United States Patent
Li et al.

(10) Patent No.: US 9,333,577 B2
(45) Date of Patent: May 10, 2016

(54) ELECTRO DISCHARGE MACHINING APPARATUS AND METHOD

(75) Inventors: Peng Li, Shanghai (CN); Bin Wei, Mechanicville, NY (US); Huiya Xu, Shanghai (CN); Mark Joseph Gleason, Madisonville, KY (US); William Charles Allison, West Chester, OH (US); Jeffrey Francis Wessels, Bedford, NH (US); John Fitzgerald Zurawka, Hamilton, OH (US)

(73) Assignee: General Electric Company, Niskayuna, NY (US)

( * ) Notice: Subject to any disclaimer, the term of this patent is extended or adjusted under 35 U.S.C. 154(b) by 2309 days.

(21) Appl. No.: 12/201,167

(22) Filed: Aug. 29, 2008

(65) Prior Publication Data

US 2010/0051588 A1    Mar. 4, 2010

(51) Int. Cl.
*B23H 5/00* (2006.01)
*B23H 7/20* (2006.01)
*B23H 7/30* (2006.01)
*B23H 9/14* (2006.01)

(52) U.S. Cl.
CPC .. *B23H 7/20* (2013.01); *B23H 7/30* (2013.01); *B23H 9/14* (2013.01)

(58) Field of Classification Search
CPC .............. B23H 7/20; B23H 9/14; B23H 7/30
USPC ............................................ 219/69.11–69.17
See application file for complete search history.

(56) References Cited

U.S. PATENT DOCUMENTS

| RE28,734 E | 3/1976 | Inoue |
|---|---|---|
| 4,484,051 A | 11/1984 | Yamada et al. |
| 4,760,233 A | 7/1988 | Obara |

(Continued)

FOREIGN PATENT DOCUMENTS

| DE | 102004019543 A1 | 11/2005 |
|---|---|---|
| DE | 102005027363 A1 | 12/2006 |

(Continued)

OTHER PUBLICATIONS

Search Report and Written Opinion from corresponding EP Application No. 09168266.6-1262 dated Oct. 22, 2012.

(Continued)

*Primary Examiner* — Phuong Nguyen
(74) *Attorney, Agent, or Firm* — Paul J. DiConza

(57) ABSTRACT

An electro discharge machining apparatus comprises an electrode configured to machine a desired feature in a workpiece, a pulse generator configured to energize the electrode and the workpiece to opposite electrical polarities, a machining solution source configured to pass a machining solution between the electrode and the workpiece, and a servomotor configured to drive the electrode to move relative to the workpiece. The electro discharge machining apparatus further comprises at least one detection element configured to detect machining signals, and a controller. The controller controls the pulse generator and the servomotor to machine the workpiece according to a plurality of first process parameters predetermined therein and analyzes the detected machining signals to generate a first response signal to activate a plurality of second process parameters predetermined therein and different from the first process parameters to machine the workpiece. An electro discharge machining method is also presented.

15 Claims, 2 Drawing Sheets

(56) References Cited

U.S. PATENT DOCUMENTS

| | | | |
|---|---|---|---|
| 5,360,957 A | 11/1994 | Haefner et al. | |
| 5,847,351 A | 12/1998 | Morita et al. | |
| 5,976,347 A * | 11/1999 | Wakabayashi et al. | 205/640 |
| 6,139,715 A | 10/2000 | Wei | |
| 6,200,439 B1 | 3/2001 | Wei et al. | |
| 6,234,752 B1 | 5/2001 | Wei et al. | |
| 6,264,822 B1 | 7/2001 | Wei et al. | |
| 6,267,868 B1 | 7/2001 | Wei et al. | |
| 6,290,461 B1 | 9/2001 | Wei et al. | |
| 6,292,531 B1 | 9/2001 | Hsieh | |
| 6,303,193 B1 | 10/2001 | Guida et al. | |
| 6,355,156 B1 | 3/2002 | Li et al. | |
| 6,362,446 B1 | 3/2002 | Jones et al. | |
| 6,373,018 B1 | 4/2002 | Wei et al. | |
| 6,384,364 B1 | 5/2002 | Wei et al. | |
| 6,398,941 B2 | 6/2002 | Wei | |
| 6,416,283 B1 | 7/2002 | Johnson et al. | |
| 6,554,571 B1 | 4/2003 | Lee et al. | |
| 6,562,227 B2 | 5/2003 | Lamphere et al. | |
| 6,590,178 B2 | 7/2003 | Shih | |
| 6,627,054 B2 | 9/2003 | Wei et al. | |
| 6,644,921 B2 | 11/2003 | Bunker et al. | |
| 6,723,942 B1 | 4/2004 | Lin et al. | |
| 6,787,728 B2 | 9/2004 | Wei et al. | |
| 6,858,125 B2 | 2/2005 | Wei et al. | |
| 6,897,400 B1 | 5/2005 | Yuan et al. | |
| 6,912,446 B2 | 6/2005 | Wang et al. | |
| 6,968,290 B2 | 11/2005 | Wei et al. | |
| 7,004,693 B2 * | 2/2006 | Adachi et al. | 409/144 |
| 7,214,901 B1 | 5/2007 | Ball et al. | |
| 7,394,040 B2 | 7/2008 | Wei et al. | |
| 2002/0148814 A1 | 10/2002 | Ishiwata et al. | |
| 2003/0173337 A1 | 9/2003 | Ito | |
| 2004/0200807 A1 | 10/2004 | Forrester et al. | |
| 2005/0218089 A1 | 10/2005 | Wei et al. | |
| 2005/0247569 A1 | 11/2005 | Lamphere et al. | |
| 2006/0108328 A1 | 5/2006 | Luo et al. | |
| 2007/0289949 A1 | 12/2007 | Suzuki et al. | |
| 2008/0017619 A1 | 1/2008 | Yamakawa et al. | |
| 2008/0028607 A1 | 2/2008 | Lamphere et al. | |
| 2009/0147922 A1 | 6/2009 | Hopkins et al. | |

FOREIGN PATENT DOCUMENTS

| | | |
|---|---|---|
| EP | 0717866 A1 | 6/1996 |
| JP | 11275488 A | 10/1999 |
| JP | 2008307236 A | 12/2008 |

OTHER PUBLICATIONS

European Office Action issued in connection with corresponding EP Application No. 09168266.6 on Dec. 3, 2013.

Unofficial English translation of Japanese Office Action issued in connection with corresponding JP Application No. 2009189651 on Aug. 25, 2015.

* cited by examiner

ELECTRO DISCHARGE MACHINING APPARATUS AND METHOD

BACKGROUND

This invention relates generally to electro discharge machining apparatuses and methods. More particularly, this invention relates to electro discharge machining apparatuses and methods for drilling holes in workpieces.

Electro discharge machining (EDM) is a process in which a cathodic electrode is positioned atop an electrically conducting workpiece, and a dielectric liquid is channeled therebetween. Electrical current passes between the electrode and the workpiece, and locally erodes the workpiece for forming desired features therein. In a typical application, the electrode may be used for drilling holes of any desired shape in the workpiece.

For example, many gas turbine engine components are machined with small holes therein for cooling air passing through. In particular, the electrode may be inclined relative to the engine components to drill the holes. Generally, a process for machining the holes may comprise three stages, such as a touch-in stage, a normal drilling stage and a breakthrough stage.

However, in conventional electro discharge machining processes, especially when the electrode is inclined relative to the workpiece, the touch-in stage and/or the breakthrough stage may be time-consuming because of inefficient flushing of the dielectric fluid and short-circuits between the electrode and the workpiece.

Additionally, since the touch-in stage and the breakthrough stage may not be controlled well in the conventional machining process, the quality of the holes may deteriorate, which can reduce the lifetime of turbine engine components and cause cracking risks thereto.

Therefore, there is a need for a new and improved electro discharge machining apparatus and method for machining workpieces.

BRIEF DESCRIPTION

An electro discharge machining apparatus is provided in accordance with one embodiment of the invention. The electro discharge machining apparatus comprises an electrode configured to machine a desired feature in a workpiece, a pulse generator configured to energize the electrode and the workpiece to opposite electrical polarities, a machining solution source configured to pass a machining solution between the electrode and the workpiece, and a servomotor configured to drive the electrode to move relative to the workpiece. The electro discharge machining apparatus further comprises at least one detection element configured to detect machining signals, and a controller. The controller controls the pulse generator and the servomotor to machine the workpiece according to a plurality of first process parameters predetermined therein and analyzes the detected machining signals to generate a first response signal to activate a plurality of second process parameters predetermined therein and different from the first process parameters to machine the workpiece.

Another embodiment of the invention further provides an electro discharge machining method. The electro discharge machining method comprises driving an electrode to move relative to a workpiece, passing an electric current between the electrode and the workpiece while circulating a machining solution therebetween to machine a desired feature in the workpiece according to a plurality of first process parameters, detecting machining signals in an electro discharge machining process, and receiving and analyzing the detected machining signals to generate a first response signal to activate a plurality of second process parameters different from the first process parameters to machine the workpiece.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF THE DISCLOSURE

Preferred embodiments of the present disclosure will be described hereinbelow with reference to the accompanying drawings. In the following description, well-known functions or constructions are not described in detail to avoid obscuring the disclosure in unnecessary detail.

Figure 1:
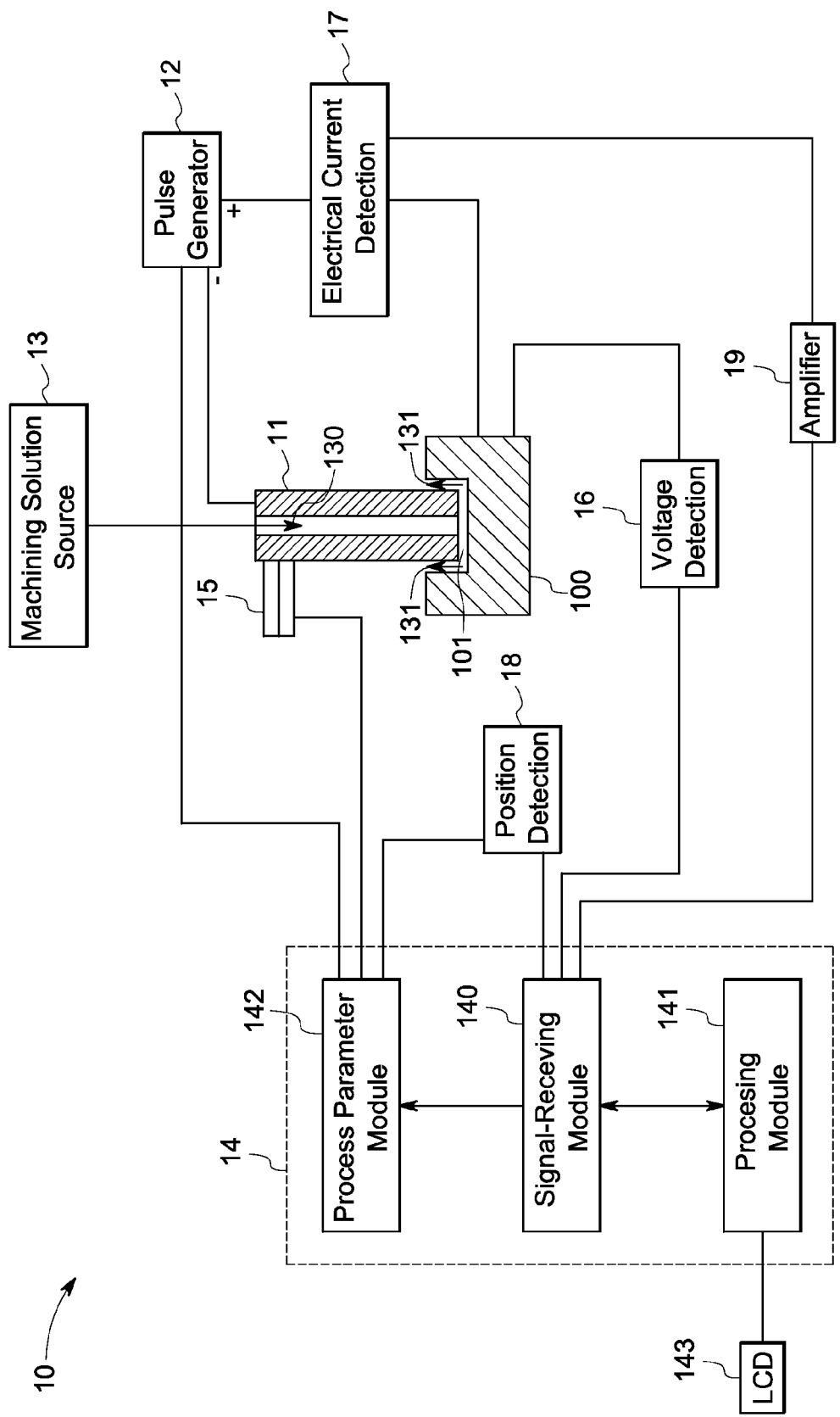
FIG. 1 is a schematic diagram of an electro discharge machining apparatus in accordance with one embodiment of the invention.

FIG. 1 illustrates a schematic diagram of an electro discharge machining apparatus 10 in accordance with one embodiment of the invention. In embodiments of the invention, the electro discharge machining (EDM) apparatus 10 may be used to machine a hole 101 in a workpiece 100. As illustrated in FIG. 1, the EDM apparatus 10 comprises an electrode 11, a pulse generator 12, a machining solution source 13, a controller 14, a servomotor 15, a voltage detection element 16, an electrical current detection element 17, and a position detection element 18.

In the illustrated embodiment, the electrode 11 and the workpiece 100 are connected to negative and positive poles of the pulse generator 12, respectively. Accordingly, in embodiments of the invention, the electrode 11 may function as a cathode and the workpiece 100 may act as an anode. The machining solution source 13 may be disposed separately and used for passing a machining solution, such as an electrolyte or deionized water between the electrode 11 and the workpiece 100. Additionally, a pump (not shown) may be connected to the machining solution source 13 for controlling machining solution pressures. Alternatively, the machining solution source 13 may connect to the controller 14. Thus, in operation, the pulse generator 12 may pass a pulse electric current between the electrode 11 and the workpiece 100 to remove material from the workpiece 100 to form the hole 101 while the machining solution carries the removed material out of the hole 101. In the illustrated embodiment, the electrode 11 is hollow. Arrows 130 and 131 indicate the circulation directions of the machining solution. Alternatively, the electrode 11 may have other configurations, which are known to one skilled in the art.

The servomotor 15 is used for driving the electrode 11 to move, such as move linearly and/or rotate. Alternatively, other suitable motors may be used for driving the electrode 11 to move. The detection elements 16-18 may be used for detecting machining signals in the electro discharge machining process (operation). For example, the voltage detection element 16 and the electrical current detection element 17 may be used for detecting signals of voltages and electrical currents between the electrode 11 and the workpiece 100, respectively. The position detection element 18 may be used for detecting signals of the position of the electrode 11 during operation. In one non-limiting example, the voltage detection element 16 and the position detection element 18 comprise a measurement device respectively, sold under the tradename Fluke DP 120, by Fluke, of Everett, Wash. Further, for this example, the electrical current detection element 17 comprises an AC/DC Current Measurement System, sold under the tradename Tektronix TCP 303, by Tektronix, of Beaverton, Oreg.

The controller 14 comprises a signal-receiving module 140, a processing module 141, and a process parameter module 142. In one non-limiting example, the signal-receiving module 140 comprises a signal-sampling device, sold under the tradename NI 6115, by National Instruments Inc., of Austin, Tex. The processing module 141 comprises a microprocessor, such as a CPU. The process parameter module 142 comprises a control cabinet, sold under the tradename EDM CT300, commercially available from Current EDM Inc., of Mountain View, Calif. In the illustrated embodiment, the signal-receiving module 140, the processing module 141, and the process parameter module 142 are disposed separately. In other embodiments, the signal-receiving module 140 and the processing module 141 may be integrated into the process parameter module 142.

In the illustrated embodiments, the process parameter module 142 may be preloaded with predetermined process parameters, and may comprise an encoder (not shown) for detecting movement of the servomotor 15 and outputting the movement signals to the position detection element 18 so that the position detection element 18 can detect the position signals of the electrode 11. The signal-receiving module 140 may be used for receiving, especially sampling the detected signals of the voltage, the electrical current and the electrode position, and outputting the received signals to the processing module 141 for analysis to generate a response signal. The process parameter module 142 may receive the response signal to control the servomotor 15 and the pulse generator 12 to perform a next action. In one embodiment, the processing module 141 may send the response signal back to the signal-receiving module 140, and then the signal-receiving module 140 may output the response signal to and trigger the process parameter module 142.

In embodiments of the invention, the term "next action" indicates the EDM apparatus 10 begins the machining of a different stage or stops the machining. The process parameters may be predetermined and input into the process parameter module 142 in advance based on experimental data, which can be easily implemented by one skilled in the art. Non-limiting examples of the process parameters include a servo feedrate, a pulse-on time, a pulse-off time, a peak current, a capacitance, a machining solution pressure, and an electrode rotation speed etc.

In certain embodiments of the invention, the EDM apparatus 10 may employ at least one of the three detection elements 16-18. The position detection element 18 may directly connect to the servomotor 15 for detecting the position signals of the electrode 11. Additionally, the EDM apparatus 10 may comprise a display device 143, such as a LCD, to connect to the processing module 141 for observing waveforms of the detected signals. Further, a current amplifier 19, such as Tektronix TCPA 300, sold by Tektronix, of Beaverton, Oreg., may be disposed between the current detection element 17 and the signal-receiving module 140 to amplify the current signals from the current detection element 17 before the electrical current signals are sent into the receiving module 140.

Figure 2C:
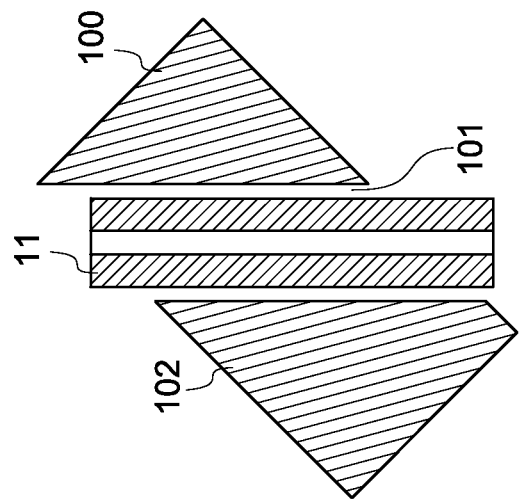
FIGS. 2(a)-2(c) are schematic diagrams for illustrating different machining stages of the electro discharge machining apparatus shown in FIG. 1.
Figure 2B:
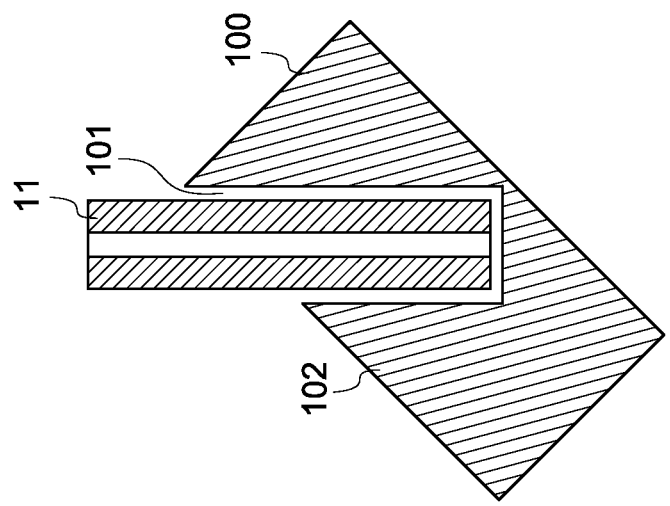
Figure 2A:
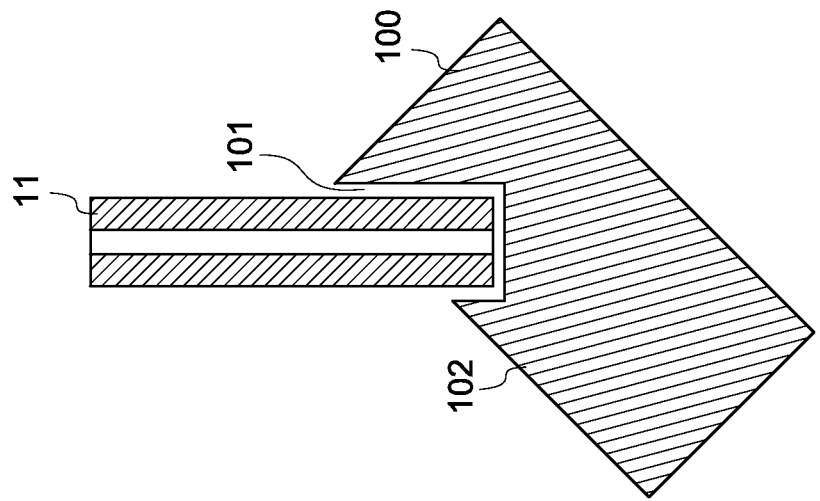

FIGS. 2(a)-2(c) are schematic diagrams for illustrating different machining stages of the electro discharge machining apparatus 10. In the illustrated embodiment, the electrode 11 is inclined relative to and is configured for machining the hole 101 in the workpiece 100. Further, for the illustrated embodiment, the hole 101 is a through hole. In embodiments of the invention, the term "inclined" indicates the electrode 11 is not perpendicular to a machining surface 102 of the workpiece 100. Alternatively, the electrode 11 may be oriented perpendicular to the workpiece 100.

In the illustrated embodiment, the machining process may comprise a touch-in stage shown in FIG. 2(a), a normal machining stage shown in FIG. 2(b), and a breakthrough stage shown in FIG. 2(c). In particular, the three machining stages may employ different process parameters to achieve respective higher machining efficiency and quality. In one embodiment, the process parameters for the touch-in stage and the normal machining stage may be the same, and different from those for the breakthrough stage. In another embodiment, the process parameters for the normal machining stage and the breakthrough stage may be the same, and different from those for the touch-in stage. Alternatively, the hole 101 may be a blind hole, in which case, the machining process would not comprise the breakthrough stage. In certain embodiments, because abnormal discharging may generally occur in the touch-in stage and the breakthrough stage, the waveforms of the detected voltage and current signals may be unstable compared to those in the normal machining stage. The waveforms for the position signals may be milder than the waveforms in the normal machining stage.

As illustrated in FIGS. 1 and 2, in embodiments of the invention, before initiation of the electro discharge machining, the process parameters for all the stages are input into the process parameter module 142. Then, the electrode 11 approaches the workpiece 100 to an appropriate position to prepare for the machining, which is known to one skilled in the art. At this time, the first process parameters in the process parameter module 142 for the touch-in stage may be automatically activated to control the pulse generator 12 and the servomotor 15 to begin the machining.

During the machining of the touch-in stage, the detection elements 16-18 detect three data groups comprising the voltage, the electrical current and the position signals in real-time. And the signal-receiving module 140 receives and samples the detected signals of the voltage, the current and the position, respectively. In one example, the pulse-on time of the discharging may be 8 microseconds, and a sampling frequency of the signal-receiving module 140 may be 500000 times per second. For this example, the signal-receiving module 140 samples 4 signal data points in each of the detected voltage, electrical current and position signals in 8 microseconds, respectively. In other examples, the signal-receiving module 140 may sample more than 4 signal data points.

Next, the sampled signal data points in the three data groups are sent to the processing module 141 for analyzing. For example, the processing module 141 may comprise a program to calculate average values of every two adjacent signal data points in each data group and to compare each average value in each data group with respective values of a first threshold value group predetermined therein to determine whether to end the machining of the touch-in stage and to begin the normal machining stage, which may be implemented by one skilled in the art. In certain embodiments, the position signal data may first be converted to velocity data format in the processing module 141 for subsequent analysis.

When analyzed results for the sampled signal data match the respective values in the first threshold value group predetermined for the voltage, the current and the position signal data in the processing module 141, respectively, the processing module 141 may generate a first response signal to trigger the process parameter module 142 to end the machining of the touch-in stage and to activate the second process parameters for the normal machining stage.

In embodiments of the invention, the processing module 141 may further comprise a second threshold value group and a third threshold value group as well as the first threshold value group. According to particular embodiments, the values in each of the threshold value groups are predetermined in the processing module 141 based on experimental data. In particular, the values in second threshold value group may be used for identifying when to end the normal machining stage and to begin the breakthrough stage. The values in the third threshold value group may be used for identifying when to end the breakthrough stage. In the illustrated embodiment, the detection elements 16-18 are all employed, therefore, each of the first, second and third threshold value groups may comprise three preset values for the voltage, the current and the position signal data, respectively. Alternatively, when one or two detection elements may be employed, each of the first, second and third threshold value groups may comprise one or two preset values.

Subsequently, the machining of the normal stage begins according to the activated second process parameters for this stage. Meanwhile, the one or more detection elements 16-18 detect and send the respective signals in real-time to controller 14 for processing. When the analyzed results of the detected signal data in the processing module 141 match the respective values in the second threshold value group, the processing module 141 may generate a second response signal to trigger the process parameter module 142 to inactivate the second process parameters for the normal machining stage and activate the third process parameters for the breakthrough stage.

Thus, the machining for the breakthrough stage begins. Similarly, the detection elements 16-18 detect and send the respective signals in real-time to controller 14 for processing. When the analyzed results of the detected signal data in the processing module 141 for this stage match the respective values in the third threshold value group, the processing module 141 may generate a third response signal to trigger the process parameter module 142 to end the machining. Because of existence of the detection elements, the EDM apparatus 10 may end the machining upon completion of the breakthrough stage, thereby avoiding having the electrode 11 damage other structures of the workpiece so as to improve the machining quality.

In certain embodiments of the invention, acoustic and the machining solution pressure signals during operation may be used for determining the machining stages. In embodiments of the invention, terms of the first, second, and third process parameters, response signals or threshold value groups are used for illustrating entire machining stages conveniently. Therefore, for example, when focusing on two machining stages, such as the normal machining stage and the breakthrough stage, the second process parameters, response signal or threshold value group described above may be defined as first process parameters, response signal or threshold value group, respectively. Similarly, the third process parameters, response signal or threshold value group described above may be defined as second process parameters, response signal or threshold value group, respectively.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. An electro discharge machining apparatus, comprising:
    an electrode configured to machine a desired feature in a workpiece;
    a pulse generator configured to energize the electrode and the workpiece to opposite electrical polarities;
    a machining solution source configured to pass a machining solution between the electrode and the workpiece;
    a motor configured to drive the electrode to move relative to the workpiece;
    at least one detection element configured to detect machining signals;
    a controller configured to control the pulse generator and the motor to machine the workpiece according to a plurality of first process parameters predetermined therein and to analyze the detected machining signals to generate a first response signal to activate a plurality of second process parameters predetermined therein and different from the first process parameters to machine the workpiece;
    wherein the controller comprises a signal-receiving module for receiving the machining signals, a processing module for analyzing the received machining signals from the signal-receiving module to generate the first response signal, and a process parameter module storing the first and second predetermined process parameters;
    wherein the desired feature in the workpiece comprises a through hole; and
    wherein the controller is configured to operate in accordance with an electro discharge machining process comprising a touch-in stage, a normal machining stage, and a breakthrough stage.

2. The electro discharge machining apparatus of claim 1, wherein the electrode is inclined relative to the workpiece.

3. The electro discharge machining apparatus of claim 1, wherein the electro discharge machining apparatus further comprises one or more of a position detection element, a voltage detection element, and an electrical detection element for detecting the machining signals of the electrode position, and the machining signals of the voltage and the electrical current between the electrode and the workpiece, respectively.

4. The electro discharge machining apparatus of claim 1, wherein the first process parameters are predetermined for the touch-in stage and the second process parameters are predetermined for the normal machining stage, wherein the process parameter module further stores third process parameters predetermined for the breakthrough stage.

5. The electro discharge machining apparatus of claim 4, wherein the third process parameters are different from the first and second process parameters.

6. The electro discharge machining apparatus of claim 4, wherein the processing module generates a second response signal for activating the third process parameters.

7. The electro discharge machining apparatus of claim 6, wherein the processing module generates a third response signal for ending the breakthrough stage.

8. The electro discharge machining apparatus of claim 7, wherein the first, second, and third response signals are sent back to the signal-receiving module from the processing module, and the signal-receiving module outputs the received first, second, and third response signals to the process parameter module.

9. The electro discharge machining apparatus of claim 1, wherein the detection element comprises at least an electrical current detection element, and the electro discharge machining apparatus further comprises an amplifier disposed between the electrical current detection element and the signal-receiving module.

10. An electro discharge machining method, comprising:
    driving an electrode to move relative to a workpiece;
    passing an electric current between the electrode and the workpiece while circulating a machining solution therebetween to machine a desired feature in the workpiece according to a plurality of first process parameters;
    detecting machining signals during an electro discharging operation; and
receiving and analyzing the detected machining signals to generate a first response signal to activate a plurality of second process parameters different from the first process parameters to machine the workpiece;
    wherein the desired feature comprises a through hole; and
    wherein the electro discharge machining operation comprising a touch-in stage, a normal machining stage, and a breakthrough stage, the first and second process parameters are predetermined for the touch-in stage and the normal machining stage respectively, and wherein the breakthrough stage is machined according to a plurality of third predetermined process parameters.

11. The electro discharge machining method of claim 10, wherein the electric current comprises a pulse current.

12. The electro discharge machining method of claim 10, wherein the machining signals comprises one or more of signals of electrode position and signals of voltage and electrical current between the electrode and the workpiece.

13. The electro discharge machining method of claim 10, wherein the third process parameters are different from the first and second process parameters.

14. The electro discharge machining method of claim 13, further comprising generating a second response signal for activating the third process parameters.

15. The electro discharge machining method of claim 14, further comprising generating a third response signal for ending the breakthrough stage.

* * * * *